United States Patent Office 3,664,848
Patented May 23, 1972

3,664,848
PROCESS OF PRODUCING A SOY-CONTAINING
READY-TO-EAT BREAKFAST CEREAL
William T. Bedenk, Springfield Township, Hamilton County, and Edward R. Purves, Forest Park, Ohio, assignors to The Procter & Gamble Company, Cincinnati, Ohio
No Drawing. Filed June 29, 1970, Ser. No. 50,923
Int. Cl. A23l 1/10
U.S. Cl. 99—83
10 Claims

ABSTRACT OF THE DISCLOSURE

Production of high protein soy-containing breakfast cereals by intimately mixing a soy protein source, proteolytic enzyme and gelatinized cereal grain, thereafter processing this mixture into a ready-to-eat breakfast cereal having a protein content of greater than 20%. Water, extracted from the gelatinized cereal grain together with the proteolytic enzyme, causes a partial hydrolysis of the soy protein thereby making it more palatable.

BACKGROUND OF THE INVENTION

This invention relates to a novel process of producing a ready-to-eat or cold breakfast cereal, the two terms having reference to the same food product. More specifically, this invention relates to a process of producing a soy-containing cereal that is tasteful, has excellent eating qualities and has a protein content of greater than 20%.

Disclosed in commonly assigned concurrently filed herewith applications Ser. No. 50,924, High Protein Ready-To-Eat Breakfast Cereals Containing Soy Isolate by William T. Bedenk, 50,925, High Protein Ready-To-Eat Breakfast Cereals Containing Soy Concentrate by William T. Bedenk and 50,980, Production of Ready-To-Eat Breakfast Cereals Containing Soy Flour by Alexander L. Liepa are novel cold cereal products containing soy protein isolate, soy protein concentrate, and soy flour, respectively. The use of soy in breakfast cereal products has, prior to the above applications, been limited due to the soy's characteristic bitter beany flavor note and its adverse effect on the cereal's eating qualities, i.e. its crispness and tenderness. However, unexpectedly, it has been discovered that treatment of soy protein with water and a proteolytic enzyme results in a partial hydrolysis that causes a cereal product containing the treated soy protein source to be more palatable than a cereal product containing untreated soy. As disclosed in the aforementioned copending applications, the soy protein source is partially hydrolyzed and then added to a cooked cereal grain selected from the group consisting of corn, wheat, rice, oats, and mixtures thereof to form a dough. This dough is thereafter processed into the desired final form suitable for human consumption. In each of the above referred to processes the cooking or gelatinizing of the cereal grain requires at least 12% water depending on the particular grain and method of cooking. The partial hydrolysis of the soy protein source likewise requires a substantial amount of water for its reaction, e.g. ranging up to 80%. In the absence of any separate partial drying step of either main component a dough made from the cooked grain and the treated protein source is quite moist and hard to process. For instance, if the minimum amount of water was used in both the gelatinization and hydrolysis operations, a dough made by combining the two components is so moist and lacks so much body that it cannot be further processed without special precautions being taken. Special handling or a need for special equipment to process such a moist cereal dough is quite undesirable. For this reason it has been necessary to partially dry the cooked cereal grain to a moisture content of less than 5% prior to mixing with the partially hydrolyzed soy. After this partial drying and blending with the treated soy, the resultant dough can be further processed on existing equipment without the need for special handling.

The soy protein source can be hydrolyzed under pressure wherein relatively low amounts of water are sufficient for the reaction, in which case the dough formed by blending this partially hydrolyzed soy source with a cooked cereal grain is not overly moist. However, the separate processing of the soy source and cereal grain flour prior to combining them to form a dough is burdensome.

A moisture removal step and/or separate processing of soy and cereal grain is quite bothersome and time consuming. Accordingly, it is an object of the present invention to produce a breakfast cereal product in a relatively simple and inexpensive manner. More specifically, it is an object to produce a high protein soy-containing cereal by a novel process having less processing steps than known heretofore. These and other objects will become apparent from the following description of the invention. from the following description of the invention.

SUMMARY OF THE INVENTION

Briefly stated, this invention concerns a novel process for the production of tasteful and highly palatable nutritious breakfast cereals. More specifically soy-containing breakfast cereals having a protein content of greater than 20% are produced by gelatinizing a cereal grain and adding thereto a soy protein source and a proteolytic enzyme and blending to form a dough that is suitably used to form the desired breakfast food product.

In a preferred aspect of the invention a soy protein source and a proteolytic enzyme are blended with a cooked cereal grain, extruded, pelletized, flaked and puffed to form a ready-to-eat breakfast food.

DESCRIPTION OF THE INVENTION

In the present invention there is produced a high protein content soy-containing breakfast cereal product in any shape or form desired. Soy protein is partially hydrolyzed in the presence of a proteolytic enzyme and a gelatinized cereal grain selected from the group consisting of corn, wheat, rice, oats, and mixtures thereof and further processed to the desired end product.

The soy source useful in the present invention can be either defatted soy flour, soy protein concentrate, or soy protein isolate. As used herein soy protein concentrate and soy protein isolate will be referred to by the more common terms of soy concentrate and soy isolate, respectively. All three forms of defatted soy protein are commercially available and the processing of soybeans to produce them forms no part of the instant invention. Soy flour, or, as synonymously used, soy meal now commercially available, contains from 40% to 60% protein but as used herein contains from 40% up to 70% protein on a dry weight basis. Soy concentrate and soy isolate contain from 70% up to 90% and from 90% up to 100% protein, respectively, on a dry weight basis. The choice of the soy protein source used in the formulation of the cereal products of the present invention is dependent on various factors. Soy isolate contributes less of a soy taste and color to the final product than does soy concentrate or soy flour but is also the most expensive. Soy flour is the cheapest of the three protein sources and thus is attractive in this respect. Soy concentrate is intermediate in price and also intermediate in the degree of soy taste and color imparted to the final cold cereal product. The particular soy protein source used is dependent on cost consideration and the degree of soy taste and color that can be tolerated, though an eminently satisfactory product is produced from all three protein sources.

In the description to follow, the generic term soy protein source covering soy flour, concentrate, and isolate will be used in describing the invention. In all cases soy flour, soy concentrate, and soy isolate are used in the process without any substantial changes in processing condtions necessitated. Because of the differing protein contents of the three protein sources, different amounts of a cereal grain are blended with each protein source to produce the high protein content cereals of this invention. However, regardless of the proportions of soy protein source and cereal grain, the processing of a dough made from the two is essentially the same. Any deviations in the processing of soy flour, soy concentrate, or soy isolate from the processing described hereinafter will be noted.

The degree of partial hydrolysis experienced by the soy protein source is primarily a function of the particular enzyme used, enzyme level, temperature, amount of water present, and the amount of interfering material present. Because of the latter two factors it would be expected that soy protein when added to a gelatinized or cooked cereal grain would not undergo a partial hydrolysis reaction. The grains of the present invention are cooked in an amount of water ranging from 12% to 75% by weight of the total mixture depending on the particular grain and cooking method. At such relatively low water levels it would be expected that the cereal grain would tenaciously hold onto the water, thus making it unavailable to enter into the partial hydrolysis of the soy protein. However, when processed according to the conditions hereinafter set out, the soy protein when added to a cooked cereal grain does unexpectedly undergo a partial hydrolysis without requiring water additional to the amount needed to gelatinize the cereal grains.

In accord with the present invention, a cereal grain selected from the group consisting of corn, wheat, oats, rice, or mixtures thereof is first cooked in the presence of water to become thoroughly gelatinized. Gelatinization is the term used to describe the process of hydration and irreversible granule swelling. Gelatinization is accomplished by any of the methods known in the art. Thus, either a batch cooking or continuous cooking operation are used. Different methods of cooking include heating at atmospheric pressure in an agitated kettle, heating at elevated pressure in a tumbling type mixer, and heating under high pressure in a continuous mixer-extruder.

The amount of water and temperature needed to gelatinize the grains depends upon the particular grain and the particular method used. The preferred method of gelatinizing the cereal grain is by cooking in an extruder under pressure. Such a process is continuous and is accomplished with greater ease. Additionally, the use of higher pressures attainable in the extruder allow the use of higher temperatures and also lower water levels than possible with a batch type cooking operation. The use of lower water levels thus minimizes the amount of drying required in subsequent steps. Using an extrusion type process at 100 p.s.i.g. to 200 p.s.i.g. pressure and temperatures in the range of 250° F. to 350° F., 12% to 25% water based on the total mixture is sufficient to gelatinize the cereal grain. Even under other cooking conditions the amount of moisture present, e.g. up to 75% based on the total mixture, is held quite tenaciously and under process conditions used prior to the present invention unavailable for the partial hydrolysis of a protein source. Because of the water retention factor of gelatinized cereals, it had been necessary to segregate the gelatinization of the cereal grain and the partial hydrolysis of the soy protein. The separately processed components were, after a partial drying of either one, combined into a dough of the proper consistency for further cold cereal making. By the present invention the soy protein does not have to be hydrolyzed in a container separate from the gelatinized grain but is added to the cooked grain and in effect extracts water from it, thereby obviating not only the need to process the soy protein in separate equipment but also any moisture removal step.

As described in the aforementioned applications, soy protein is made more palatable by first subjecting it to a partial hydrolysis, i.e. the protein molecule is only partially digested. An over-hydrolyzed soy protein source imparts to a cereal product containing it an unacceptable taste, while a cereal product containing a soy protein source that has been under-hydrolyzed has an unacceptable taste and eating qualities. For the purpose of this process overhydrolyzed and under hydrolyzed refer to degrees of partial hydrolysis that occur outside of the process conditions disclosed in the aforementioned co-pending applications and herein. This partial hydrolysis is accomplished by reacting the soy protein with water in the presence of proteolytic enzyme for a length of time at an elevated temperature. Unexpectedly when soy protein is subjected to this treatment and processed into a breakfast food product, there results a product that is more tender with less tendency to develop a toughness when exposed to an aqueous liquid and that has better crispness retention than is a cold cereal product containing soy which had not been partially hydrolyzed. The reason for this phenomenon is not known and could not be predicted.

The use of proteolytic enzymes for promoting the hydrolysis of proteins is known and have been used heretofore. However, the fact that a proteolytic enzyme and water treatment of soy protein to provide a partial hydrolysis would improve its taste, eating qualities, and processing when made into a cold cereal product was unexpected. The enzymes used in the process of the present invention cause a hydrolysis of the protein source and is to be contrasted with other types of enzymes such as amylolytic, lipolytic, or sucrolastic enzymes. The enzyme of the present invention attack the peptide bonds of the polypeptide chains that make up the protein molecule thereby causing a partial hydrolysis. The proteolytic enzymes useful in the present invention are selected from any of several known proteolytic enzymes or mixtures thereof extracted from animal, plant, fungal, and microbial sources. A primary consideration in the enzyme or enzyme mixture used is that it must not contribute a significantly objectionable flavor or odor to the final product. Some examples of proteolytic enzymes found effective in the soy treatment are. papain, pepsin, bromelin, ficin, alcalase, maxitaste, thermoase, pronase, and mixtures thereof.

After the cereal grain has been thoroughly gelatinized the soy protein and proteolytic enzymes are blended therewith. According to the present invention, a breakfast cereal having a protein content of at least 20% is desired. While the soy source provides the main source of protein, cereal grains such as corn, rice, oats, and wheat have protein contents on a dry weight basis of approximately 9%, 7%, 12%, and 14%, respectively, and must be given consideration in determining the formulation of the cereals of the present invention. The exact protein contents of the cereal grain and the soy protein source as well as the relative proportion of cereal grain to soy source to produce the desired end product are easily determined. Most preferably, the "base cereal particle," i.e. the cereal particle consisting of soy protein and cereal grain without any additives, contains on a dry weight basis the following percentages of soy source with the balance being the listed cereal grain:

|  | Percent | | |
|---|---|---|---|
|  | Soy flour | Soy concentrate | Soy isolate |
| Corn | 18–68 | 14–34 | 12–26 |
| Rice | 20–70 | 16–37 | 14–28 |
| Oats | 10–62 | 8–29 | 7–21 |
| Wheat | 14–64 | 10–31 | 9–23 |

Mixtures of the above cereal grains and soy sources are also readily formulated to contain the desired total protein content.

25 p.p.m. to 2500 p.p.m. proteolytic enzyme based on the dry weight of the soy protein source is added. Preferred enzyme addition levels on a dry weight basis are 100 p.p.m. to 600 p.p.m. of soy protein source. The same enzyme levels are used for soy isolate, soy concentrate and soy flour.

After the cooked cereal, soy protein, and proteolytic enzyme are blended they are subjected under pressure to a temperature of 80° F. to 160° F. Pressures in the range of 100 p.s.i.g. to 1000 p.s.i.g. are preferred. Under these reaction conditions the soy protein is able to extract sufficient water from the cooked cereal and, while in the presence of the proteolytic enzyme, is able to become partially hydrolyzed. The most preferred temperatures and pressures under which the above partial hydrolysis is able to take place are 110° F. to 150° F. and 200 p.s.i.g. to 500 p.s.i.g., respectively. The pressures and temperatures involved in this operation are most conveniently obtained in an extruder. Residence times up to one hour are used, but practically speaking 3 minutes to 6 minutes is preferred. The fact that water sufficient to cause the partial hydrolysis of the soy protein is extracted from the cooked cereal grains of the present invention under any conditions was quite unexpected. In spite of the tenaciousness of the cooked grain holding onto the water, under the above stated temperature and pressure conditions the desired soy protein partial hydrolysis does occur. As a result of this surprising occurrence there is produced a dough (the blended mixture of gelatinized grain and soy protein) that is of a consistency suitable for further cold cereal processing on existing equipment.

The above blending can take place in an extruder, although other equipment capable of standing the temperatures and pressures needed in the reaction can be used. An extruder is preferred because it can extrude the reaction mixture through dies in a form convenient for further cereal processing. For instance, in a preferred method of making the high potein content soy containing cereal, the reaction mixture is extruded into strands of a relatively small cross-sectional area and thereafter sliced into small lengths thereby forming small pellet-like particles. These pellet-like particles are next partially dried, if necessary, and formed into flakes. The flakes are then subjected to a puffing operation to transform them into less dense and more porous flakes. Toasting and/or a coating operation may be employed to enhance the color and/or flavor of the resultant protein fortified cereal product. Alternatively, instead of producing a flake-like product, the flaking step can be omitted with a puffed spherical-shaped product being the result.

While the above described is preferred it should be recognized that other known cold cereal processing operations can be utilized in transforming the reaction mixture into a final form suitable for human consumption. For instance, besides making a flaked or puffed product, a breakfast cereal in the form of biscuits, granules, shreds, or the like can be produced in accord with known processing techniques.

In accord with the preferred process a die is used in the outlet of the extruder that produces a strand or series of strands from the reaction mixture. The shape of the strand that issues from the extruder is determined by the particular extruder die used in the outlet of the extruder and this strand, in turn, greatly influences the shape of the individual particles of the final product. For instance, if the shape of the strand is circular in its cross-sectional area the ready-to-eat cereal made from this strand will have a different shape or configuration than will a cereal product made from strands that are square, triangular, or any other shape in its cross-sectional area. The particular die used in the extruder is a matter of choice dictated primarily by the shape desired for the final product.

The strands that are extruded from the extruder are next cut so as to form pellet-like particles. The choice of the cross-sectional size of the strand issuing from the die and length of cut depends on the size requirement of the final individual piece of cereal.

After pelletizing, the pellet-like particles are tempered, if necessary, and run through flaking rolls. Depending on the formulation and process conditions used throughout the process it may be necessary to allow the strands and freshly cut pellets to cool down and/or dry somewhat. This tempering has the effect of reducing the tackiness oftentimes associated with partially processed cereal dough. A hold time of up to 30 minutes is sufficient to temper the strands while a hold time of up to two minutes is sufficient for the freshly cut pellets. With some formulations there may be no sticking problem in which case the strands and/or pellets can pass directly to the next operation without any tempering step.

If a flake-type cereal product is desired, the next step after pelletizing is flaking of the pellets. This can be accomplished by passing the pellets between a pair of cooperating rollers or a roller and a flat surface spaced apart a distance sufficient to produce the desired flake thickness. In accord with this invention it has been found that a flake thickness of 7 to 12 mils is sufficient to produce a satisfactory product. As the flakes leave the rolls they are in a dense and relatively hard condition. Such a flake is unacceptable to the average consumer and, accordingly, an additional processing step must be taken to produce a lighter, more porous and more tender flake structure.

Breakfast cereals obtain the desired flake structure by a process known as puffing. Puffing of the flake is also quite important in that it enhances the flake's crispness and tenderness. Cereal flakes containing untreated soy protein are difficult to puff but, unexpectedly, soy protein when treated in the manner heretofore described does not act as a hindrance on puffing of a cereal flake of which it forms a part and actually improves puffability. This factor is of importance in that the more porous type flakes have a tendency to be more tender than the less porous or less puffed flake. Additionally, soy flavor is diminished even more in the better puffed of two soy-containing flakes. Basically, a cereal is puffed by causing trapped moisture in the flake to expand very rapidly from the liquid state to the vapor phase. Rapid heating or a rapid decrease in pressure are the methods commonly used to convert dense hard flakes into the more palatable porous tender flakes. Both methods are well known and are commonly used throughout the industry. Gun puffing is an example of the principle of a rapid decrease in pressure. In this process the cereal flakes are first heated under high pressure and then the pressure is rapidly released to achieve the puffing effect. U.S. Pat. No. 3,253,533 describes an apparatus and process exemplary of the rapid heating method.

To achieve the optimum puffing, care must be taken in the initial moisture content of the unpuffed flake. The specific moisture content that is best depends on the particular puffing process utilized and the particular grain in admixture with the soy protein source. For instance, for a blend of soy isolate and cooked corn a moisture content of 12% to 14% is optimum for gun puffing, while 10% to 12% moisture content is best for puffing by a process that rapidly heats the flake. The optimum initial moisture content for any one particular flake composition and puffing technique can be determined experimentally.

Additional processing steps can be utilized if it is so desired. For instance, a toasting operation can be used after the puffing step if it is desired to change the color of the flake to a more desired rich golden brown. Frequently, a slight toasting step also brings out a pleasant toasted flavor note.

The flakes can also include various materials to improve taste, appearance and/or functional properties. For instance sugar, salt, flavoring, coloring and/or spices can be used in the formulation either in the original dough or as a coating on the puffed flake. Vitamins and minerals can also be included in the formulation to increase the nutritional value of the breakfast food.

Additives such as fatty acids having a carbon chain length of 12 to 24 or salts of the acid can be included in the formulation as a processing aid. Cooked cereal grains have a tendency to be tacky and thereby cause sticking problems with regard to subsequent processing steps using the cooked grain. Cereal particles also have a tendency to agglomerate together during the cooking process thereby necessitating additional processing. The incorporation of 0.1 to 2% of the aforementioned fatty acid or fatty acid salt into the uncooked cereal grain on a dry weight basis reduces the agglomerating problem as well as the sticking or clogging up of processing equipment.

The above preferred process has been described in regard to producing a product having a flake-type structure. However, if a puffed sphere-type product is desired the above described preferred process only has to be modified slightly. After the formation of pellet-type particles and the tempering period, if any is required, the cereal particles are sent directly to the puffing operation, by-passing the flaking roll or rolls. Thus, the only modification in the process described for producing a flake product is the omission of passing the pellet-like particles through the flaking step.

While rice, oats and wheat make a satisfactory product when blended with the partially hydrolyzed soy protein and processed in accordance with this invention, corn is the preferred cereal grain. A cereal dough of corn is admixture with a partially hydrolyzed soy protein source forms an especially tasteful and pleasing flake structure when formed into the final cold cereal product.

The following example is given for the purpose of illustrating the production of the novel cold cereal products. Unless otherwise indicated all percentages given are on a weight basis.

EXAMPLE I

Formulation: Grams
  Corn grits (9% protein) _____ 14.00
  Sugar _____ 82
  Salt _____ 35
  Soy isolate (95% protein) _____ 450
  Papain _____ [1] 0.20

[1] 445 p.p.m. of soy isolate.

The corn grits, sugar, salt, and 400 grams of water are blended to form a mixture having a total moisture content of 21%. The mixture is then passed through an extruder under 150 p.s.i.g. and at a temperature of 270° F. to gelatinize the corn. This cooked mixture and the remaining ingredients are blended and passed through another extruder having a residence time of 3 minutes at a temperature of 140° F. and under 200 p.s.i.g. pressure to partially hydrolyze the soy isolate. The mixture is extruded in the form of strands having a cross-sectional area of approximately 3/16 inch. The strands are then sliced into pellets of about 3/16 inch in length. The pellets are next passed through a two-roll mill to produce flakes having a thickness of about 0.009 inch. These flakes are then partially dried to a moisture content of 12%. The flakes are next puffed by being contacted with hot salt at a temperature of 350°–360° F. for 10 seconds. Thereafter the flakes are toasted at 400° F. The flakes that are produced have good eating qualities and a pleasant taste. The flakes produced by this example have a protein content of about 28%.

Flakes for comparative purpose are made by the above process with the exception that the papain is left out of the formulation. These flakes are rather tough after exposure to milk and are less preferred than the flakes made in the above example. The fact that the flakes of this example have a pleasant taste and are more tender after exposure to milk indicates that a partial hydrolysis has occurred. In the absence of any partial hydrolysis, the flakes would have the same eating qualities as the control flakes made for comparative purposes.

EXAMPLE II

Formulation: Grams
  Corn grits (9% protein) _____ 400
  Sugar _____ 40
  Salt _____ 12
  Soy flour (50% protein) _____ 225
  Bromelin _____ [1] 0.03

[1] 133 p.p.m. of soy flour.

The corn grits, sugar, salt, and 100 grams of water are blended. The resultant mixture having a moisture content of 18% is next passed through an extruder at 175 p.s.i.g. and 300° F. to thoroughly gelatinize the corn. The remaining dry ingredients are blended with the gelatinized corn and passed through another extruder operated under 400 p.s.i.g. and 150° F. and having a residence time of 3 minutes. The extrudant in the form of 3/16-inch diameter strands are then processed in the same manner as the strands of Example I. The flakes that are produced have a protein content of about 22% and have an acceptable taste and eating qualities.

A cereal product having the same formulation as in Example II with the exception of no bromelin addition is produced by the same process as in Example II. These flakes are tougher after exposure to milk than are the flakes of Example II, thereby indicating that a partial hydrolysis of the soy flour did occur during processing of the Example II flakes.

What is claimed is:
1. A process for producing a highly nutritious and palatable read-to-eat breakfast cereal having a protein content of at least 20%, comprising:
   (a) cooking a cereal grain in an amount of water ranging from 12% to 75% by weight of the total mixture to gelatinize the cereal grain;
   (b) blending with the gelatinized cereal grain an amount of soy protein source material sufficient to provide at least 20% protein on a dry weight basis in a final cereal product, and a proteolytic enzyme, which promotes partial hydrolysis of the soy protein in the presence of water, to form a dough;
   (c) subjecting the dough of step (b) to temperatures of 80° F. to 160° F. at a pressure of 100 p.s.i.g. to 1000 p.s.i.g. causing water to be extracted from the gelatinized cereal grain, said water promoting in the presence of a proteolytic enzyme, partial hydrolysis of the soy protein;
   (d) forming strands from the dough of step (c) which is comprised of gelatinized cereal grain and partially hydrolyzed soy protein;
   (e) pelletizing the strands of step (c) to form pellets; and
   (f) puffing the pellets to form the ready-to-eat breakfast cereal
2. The process of claim 1 wherein the gelatinized cereal grain contains less than 75% water.
3. The process of claim 1 wherein the soy protein source is selected from the group consisting of soy isolate, soy concentrate, and soy flour.
4. The process of claim 3 wherein the soy protein source is soy isolate.
5. The process of claim 1 wherein the cereal grain is selected from the group consisting of corn, wheat, oats, rice, and mixtures thereof.
6. The process of claim 5 wherein the cereal grain is corn.

7. The process of claim 6 wherein the soy protein source is soy isolate.

8. The process of claim 1 further comprising flaking the pellets prior to puffing.

9. The process of claim 1 wherein the proteolytic enzyme is present in an amount ranging from 25 p.p.m. to 2500 p.p.m. by weight of the soy protein source.

10. The process of claim 9 wherein the dough is subjected to 110° F. to 150° F. at 200 p.s.i.g. to 500 p.s.i.g.

References Cited

UNITED STATES PATENTS

| | | | |
|---|---|---|---|
| 2,436,519 | 2/1948 | Luke | 99—83 |
| 2,478,438 | 8/1949 | Thompson et al. | 99—82 |
| 2,853,388 | 9/1958 | Kelly et al. | 99—83 |
| 3,585,047 | 6/1971 | Fujimaki et al. | 99—98 |

RAYMOND N. JONES, Primary Examiner

PO-1050
(5/69)

UNITED STATES PATENT OFFICE
CERTIFICATE OF CORRECTION

Patent No. 3,664,848                    Dated    May 23, 1972

Inventor(s)   William T. Bedenk and Edward R. Purves

It is certified that error appears in the above-identified patent and that said Letters Patent are hereby corrected as shown below:

| | |
|---|---|
| Column 3, line 8 | "dtions" should be -- ditions --. |
| Column 5, line 41 | "potein" should be -- protein --. |
| Column 6, line 22 | "ffat" should be -- flat --. |
| Column 7, line 33 | "is" should be -- in --. |
| Column 7, line 44 | "14.00" should be -- 1400 --. |
| Column 8, line 59 | "(c)" should be -- (d) --. |

Signed and sealed this 9th day of July 1974.

(SEAL)
Attest:

McCOY M. GIBSON, JR.          C. MARSHALL DANN
Attesting Officer              Commissioner of Patents